United States Patent
Narumi et al.

(10) Patent No.: US 11,368,606 B1
(45) Date of Patent: Jun. 21, 2022

(54) IMAGE PROCESSING APPARATUS AND NON-TRANSITORY COMPUTER READABLE MEDIUM

(71) Applicant: FUJIFILM Business Innovation Corp., Tokyo (JP)

(72) Inventors: Shota Narumi, Kanagawa (JP); Makoto Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 0 days.

(21) Appl. No.: 17/337,454

(22) Filed: Jun. 3, 2021

(30) Foreign Application Priority Data

Dec. 18, 2020 (JP) .............................. JP2020-210536

(51) Int. Cl.
*H04N 1/60* (2006.01)
*H04N 1/00* (2006.01)

(52) U.S. Cl.
CPC ....... *H04N 1/6066* (2013.01); *H04N 1/00129* (2013.01); *H04N 2201/0094* (2013.01)

(58) Field of Classification Search
CPC ............. H04N 1/6066; H04N 1/00129; H04N 2201/0094
See application file for complete search history.

(56) References Cited

U.S. PATENT DOCUMENTS

| | | | |
|---|---|---|---|
| 9,299,003 B2 | 3/2016 | Narumi et al. | |
| 10,134,359 B2 | 11/2018 | Abe et al. | |
| 11,237,701 B2 * | 2/2022 | Sano | H04N 1/00432 |
| 11,240,391 B2 * | 2/2022 | Ikeda | H04N 1/00037 |
| 2003/0117457 A1 * | 6/2003 | Qiao | H04N 1/6058 347/43 |
| 2007/0053023 A1 * | 3/2007 | Suzuki | H04N 1/6086 358/518 |
| 2007/0188780 A1 * | 8/2007 | Edge | H04N 1/603 358/1.9 |
| 2009/0128835 A1 * | 5/2009 | Yao | G09G 5/02 358/1.9 |
| 2012/0218608 A1 * | 8/2012 | Maltz | G06K 15/189 358/3.28 |
| 2015/0123985 A1 * | 5/2015 | Abe | H04N 9/68 345/590 |

(Continued)

FOREIGN PATENT DOCUMENTS

| | | |
|---|---|---|
| JP | 2008271316 | 11/2008 |
| JP | 2008271316 A | * 11/2008 |

(Continued)

OTHER PUBLICATIONS

Daniel J. Jobson et al., "The Statistics of Visual Representation," Proceedings SPIE vol. 4736, Visual Information Processing XI, Jul. 2002, pp. 68-78.

*Primary Examiner* — Ted W Barnes
(74) *Attorney, Agent, or Firm* — JCIPRNET (57) ABSTRACT

An image processing apparatus includes a processor configured to adjust a reproduction parameter for correcting image visibility by changing a degree by which the reproduction parameter is to be changed from a reference value in accordance with a ratio of a second color gamut to a first color gamut. The first color gamut indicates a range in which an image is expressible by a first device. The second color gamut indicates a range in which an image is expressible by a second device.

19 Claims, 10 Drawing Sheets

(56) References Cited

U.S. PATENT DOCUMENTS

2015/0347866 A1* 12/2015 Narumi ............... G06V 10/56
382/167

FOREIGN PATENT DOCUMENTS

| JP | 5247910 | 7/2013 | | |
|---|---|---|---|---|
| JP | 6357881 | 7/2018 | | |
| WO | WO-2015087489 A1 * | 6/2015 | ........... | H04N 1/6058 |

* cited by examiner

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2020-210536 filed Dec. 18, 2020.

BACKGROUND

(i) Technical Field

The present disclosure relates to image processing apparatuses and non-transitory computer readable media.

(ii) Related Art

Japanese Unexamined Patent Application Publication No. 2008-271316 discloses an image processing method including a step of calculating an average value of pixel values within an image, a step of calculating a maximum value of the pixel values within the image, a step of calculating a minimum value of the pixel values within the image, and a replacing step. In the replacing step, pixels having pixel values in a range between a value obtained by subtracting the average value from the maximum value and the minimum value have their pixel values within the image replaced by using a gradation conversion characteristic in which the brightness increases relative to that of pixels outside the range.

Japanese Patent No. 5247910 discloses an image display apparatus that generates output image data by correcting an input image based on the Retinex theory. This image display apparatus includes a separator that separates the input image into an illumination light component and a reflection light component by using a filter, a corrected illumination light component calculator that calculates a corrected illumination light component by adjusting the separated illumination light component using an illumination light component adjustment parameter for adjusting the brightness of the separated illumination light component, and a generator that generates the output image data based on the corrected illumination light component. The corrected illumination light component calculator calculates the corrected illumination light component set based on the illumination light component adjustment parameter corresponding to a degree by which the illumination light component separated by the separator and an adjusted illumination light component obtained by adjusting the level of emphasis of a low gradation component of the illumination light component are to be mixed and added.

Japanese Patent No. 6357881 discloses an image processing apparatus that includes a characteristic information acquiring unit, an emphasis-degree information generator, and a brightness reproduction image generator. The characteristic information acquiring unit acquires characteristic information indicating the characteristics related to at least one of the distribution of specific lightness areas in a brightness image and the size of a dark flat area. The emphasis-degree information generator generates emphasis-degree information, indicating the degree of emphasis of a specific component that has an effect on the image quality of the brightness image, based on the characteristic information. The brightness reproduction image generator generates a brightness reproduction image reproduced such that the specific component of the brightness image is emphasized based on the degree of emphasis indicated by the emphasis-degree information. The characteristic information acquiring unit acquires aggregation-degree information indicating the degree of aggregation of lightness areas having multiple lightness levels in the brightness image as the characteristic information indicating the characteristics related to the distribution of the specific lightness areas in the brightness image. The emphasis-degree information generator generates the emphasis-degree information based on the aggregation-degree information and the weight of each of the multiple lightness levels.

SUMMARY

For example, even if a reproduction parameter to be applied to an image output from a first device, such as a liquid crystal display, is to be directly applied to an image output from a second device, such as a printer, the outputtable color gamut varies between the devices. Thus, the reproduction parameter to be used in the first device may sometimes be not an appropriate reproduction parameter to be used in the second device.

Aspects of non-limiting embodiments of the present disclosure relate to an image processing apparatus and a non-transitory computer readable medium that enable improved visibility of an image to be output from a second device, as compared with a case where a reproduction parameter to be applied to an image output from a first device is directly applied to the second device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a processor configured to adjust a reproduction parameter for correcting image visibility by changing a degree by which the reproduction parameter is to be changed from a reference value in accordance with a ratio of a second color gamut to a first color gamut. The first color gamut indicates a range in which an image is expressible by a first device. The second color gamut indicates a range in which an image is expressible by a second device.

BRIEF DESCRIPTION OF THE DRAWINGS

Exemplary embodiments of the present disclosure will be described in detail based on the following figures, wherein.

DETAILED DESCRIPTION

Background of Disclosure

With the current popularization of information and communication technology (ICT) devices, such as smartphones and tablets, anyone is capable of easily capturing an image at any place. While enhanced convenience is achieved in this manner, a special emphasis is placed on enhanced visibility of images affected by illumination, such as backlight and shadows, due to diverse usage environments.

In the field of image processing, brightness-related or color-related correction and emphasis, such as gamma correction, saturation emphasis, band emphasis, contrast emphasis, and dynamic range correction, are performed for the purpose of desired reproducibility and improved visibility.

Normally, the aforementioned correction and emphasis processes to be performed include a type of process involving designating the mode and intensity on the user interface (UI) of the software, a type of process involving mechanically setting an optimal reproduction parameter within the software, and a type of process involving a combination of the two aforementioned types of processes. In order to mechanically set an optimal reproduction parameter, an evaluation indicator indicating the quality of reproducibility is necessary. In many cases, a feature value of an image calculated from an image histogram or frequency is used as the indicator, and the correction is performed in accordance with the feature value.

In contrast, in the following exemplary embodiments, an optimal reproduction parameter is set in accordance with a feature value in view of the color gamut of an output device and the visual characteristics, so as to improve the visibility of dark areas.

First Exemplary Embodiment

A first exemplary embodiment of the present disclosure will be described below with reference to the drawings. In the drawings, identical or equivalent components and sections are given the same reference signs. Furthermore, the dimensional ratios in the drawings are exaggerated for the sake of convenience and may sometimes differ from the actual ratios.

Figure 1:
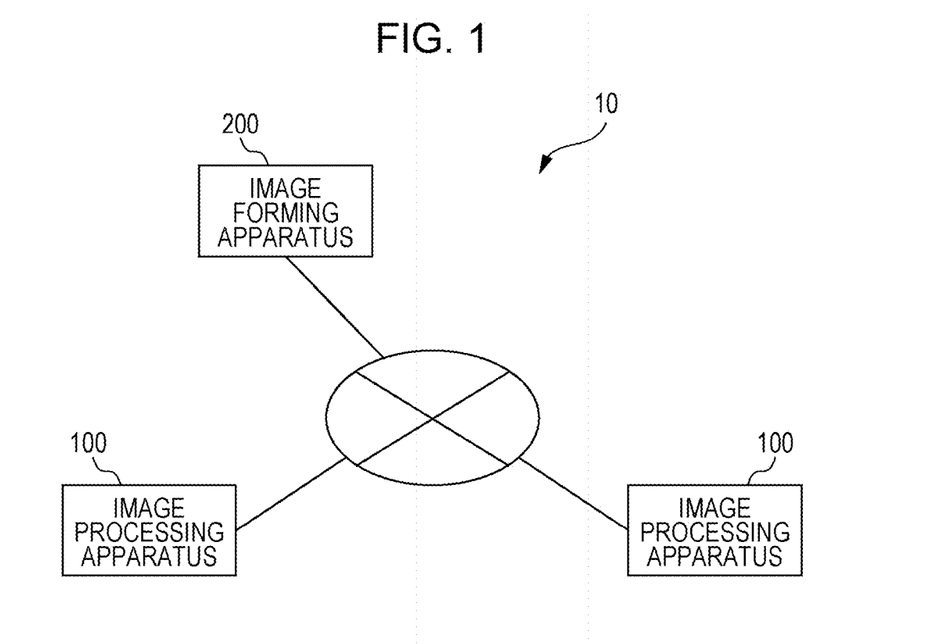
FIG. 1 schematically illustrates the configuration of an image processing system according to an exemplary embodiment of the disclosure.

FIG. 1 schematically illustrates the configuration of an image processing system 10 according to the first exemplary embodiment.

As shown in FIG. 1, in the image processing system 10, image processing apparatuses 100 and an image forming apparatus 200 are connected to a communication unit, such as a network. As will be described later, the communication unit used may be any of various types of networks, such as the Internet, an intranet, and Ethernet (registered trademark). Although two image processing apparatuses 100 and a single image forming apparatus 200 are shown in FIG. 1, the number of image processing apparatuses 100 and the number of image forming apparatuses 200 are not limited. In the first exemplary embodiment, each image processing apparatus 100 is a personal computer (PC). The image forming apparatus 200 has various types of functions, such as a printing function. In addition to the printing function, the image forming apparatus 200 may have a copying function, a facsimile function, and a scanning function.

Figure 2:
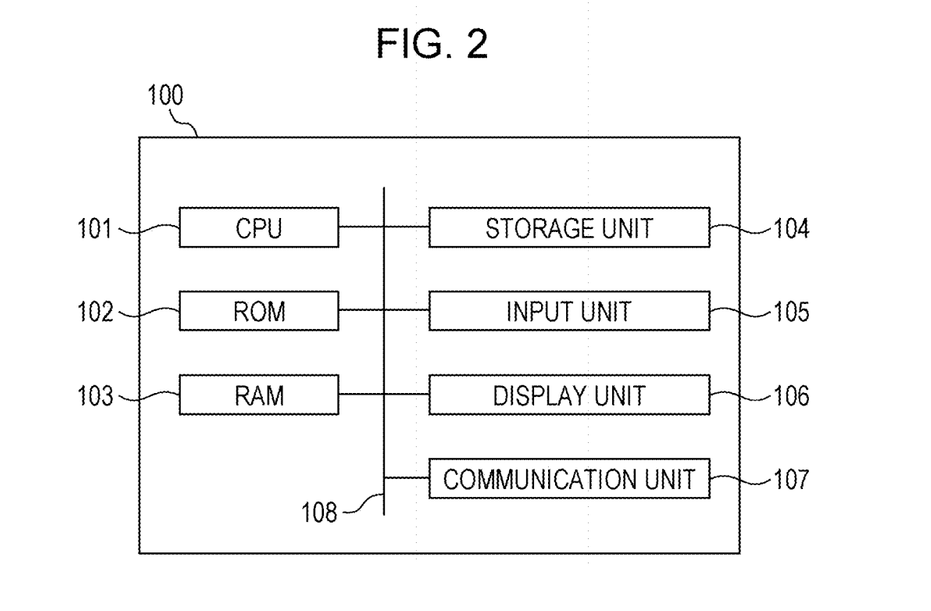
FIG. 2 is a block diagram schematically illustrating an image processing apparatus according to a first exemplary embodiment of the disclosure.

FIG. 2 is a block diagram illustrating a hardware configuration of each image processing apparatus 100 according to the first exemplary embodiment.

As shown in FIG. 2, the image processing apparatus 100 has a central processing unit (CPU) 101 as an example of a processor, a read only memory (ROM) 102, a random access memory (RAM) 103, a storage unit 104, an input unit 105, a display unit 106, and a communication unit 107. These components are connected to one another in a communicable manner via a bus 108.

The CPU 101 executes various types of programs and controls each component. Specifically, the CPU 101 reads a program from the ROM 102 or the storage unit 104 and executes the program by using the RAM 103 as a work area. The CPU 101 controls the aforementioned components and performs various types of arithmetic processes in accordance with the program stored in the ROM 102 or the storage unit 104. In the first exemplary embodiment, the ROM 102 or the storage unit 104 stores programs therein.

The ROM 102 stores various types of programs and various types of data therein. The RAM 103 serves as a work area and temporarily stores a program or data therein. The storage unit 104 is a hard disk drive (HDD) or a solid state drive (SSD), and stores various types of programs, including an operating system, and various types of data.

The input unit 105 includes a pointing device, such as a mouse, and a keyboard, and is used for inputting various types of information.

The display unit 106 is an example of a first device and is, for example, a liquid crystal display. The display unit 106 displays various types of information based on control by the CPU 101. Moreover, the display unit 106 may be of a touchscreen type to function as the input unit 105. In this description, a liquid crystal display is described as an input device.

The communication unit 107 is provided for communicating with another apparatus, such as the image forming apparatus 200 or a server apparatus (not shown), and uses a standard, such as a public line, the Internet, an intranet, Ethernet (registered trademark), fiber distributed data interface (FDDI), or Wi-Fi (registered trademark).

Figure 3:
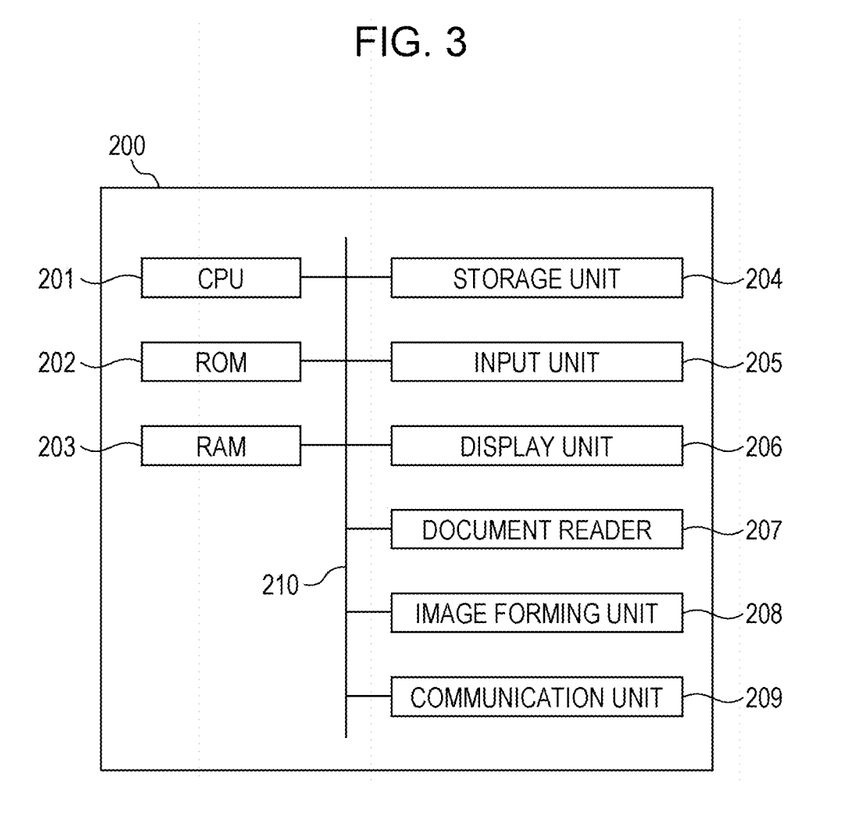
FIG. 3 is a block diagram schematically illustrating an image forming apparatus according to the first exemplary embodiment of the disclosure.

FIG. 3 is a block diagram illustrating a hardware configuration of the image forming apparatus 200 according to the first exemplary embodiment.

As shown in FIG. 3, the image forming apparatus 200 has a CPU 201 as an example of a processor, a ROM 202, a RAM 203, a storage unit 204, an input unit 205, a display unit 206, a document reader 207, an image forming unit 208, and a communication unit 209. These components are connected to one another in a communicable manner via a bus 210.

The CPU 201 executes various types of programs and controls each component. Specifically, the CPU 201 reads a program from the ROM 202 or the storage unit 204 and executes the program by using the RAM 203 as a work area. The CPU 201 controls the aforementioned components and performs various types of arithmetic processes in accordance with the program stored in the ROM 202 or the storage unit 204. In the first exemplary embodiment, the ROM 202 or the storage unit 204 stores programs therein.

The ROM 202 stores various types of programs and various types of data therein. The RAM 203 serves as a work area and temporarily stores a program or data therein. The storage unit 204 is a hard disk drive (HDD) or a solid state drive (SSD), and stores various types of programs, including an operating system, and various types of data.

The input unit 205 includes a pointing device, such as a mouse, and a keyboard, and is used for inputting various types of information.

The display unit 206 is, for example, a liquid crystal display. The display unit 206 displays various types of information based on control by the CPU 201. Moreover, the display unit 206 may be of a touchscreen type to function as the input unit 205.

The document reader 207 takes in documents placed on a sheet feed tray of an automatic feeder (not shown) provided at an upper section of the image forming apparatus 200 in a one-by-one fashion and optically reads each document so as to obtain image information. Alternatively, the document reader 207 may obtain image information by optically reading a document placed on a base, such as a platen glass member.

The image forming unit 208 is an example of a second device and is configured to form, that is, print, an image onto a recording medium, such as paper, based on image information obtained from the image processing apparatus 100 or image information obtained as a result of a reading process performed by the document reader 207. In this description, an image forming unit is described as an output device.

The communication unit 209 is provided for communicating with another apparatus, such as an image processing apparatus 100 or the server apparatus (not shown), and uses a standard, such as a public line, the Internet, an intranet, Ethernet (registered trademark), FDDI, or Wi-Fi (registered trademark).

Furthermore, the communication unit 209 connects the image forming apparatus 200 to a public line and exchanges the image information obtained as a result of the reading process performed by the document reader 207 with another image forming apparatus having a facsimile (FAX) function.

Each image processing apparatus 100 uses the aforementioned hardware resources to realize the various types of functions. A functional configuration realized by each image processing apparatus 100 will now be described.

Figure 4:
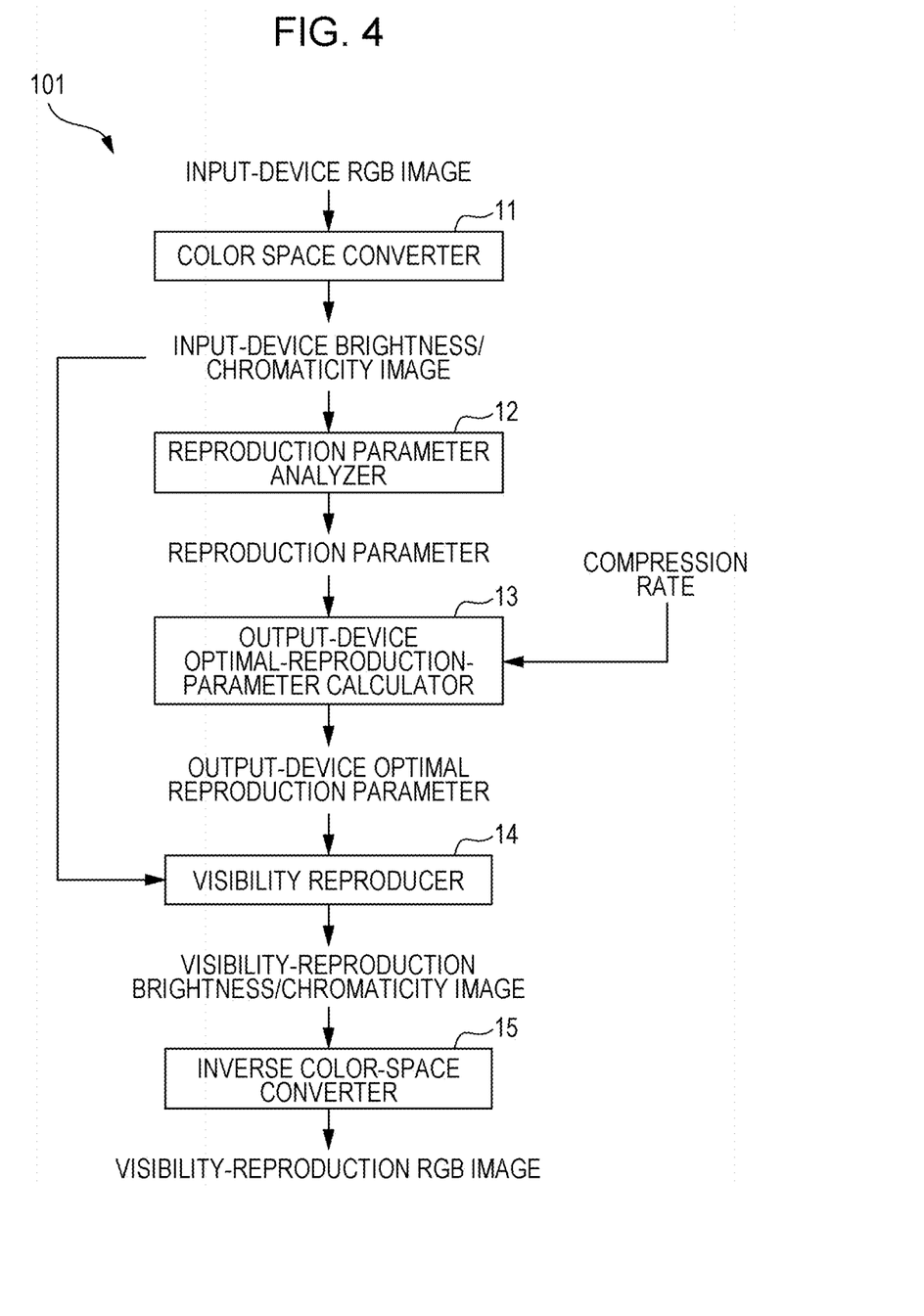
FIG. 4 is a block diagram illustrating an example of a functional configuration of the image processing apparatus according to the first exemplary embodiment of the disclosure.

FIG. 4 is a block diagram illustrating an example of the functional configuration of the image processing apparatus 100.

Color Space Converter 11

A color space converter 11 converts an input-device RGB image displayed in, for example, sRGB on a display into a lightness/chromaticity color space, such as a CIE L*a*b* color space. The components of CIE L*, a*, b* respectively indicate lightness, chromaticity in the red-green direction, and chromaticity in the blue-yellow direction. In the first exemplary embodiment, a* and b* will be defined as chromaticity components, and L* will be defined as a brightness component. The color space may be of any type so long as the color space is separable into lightness and chromaticity components, such as Lαβ, CAM02, and HSV.

Visibility Reproducer 14

A visibility reproducer 14 performs a reproduction process on a brightness image for enhancing the visibility thereof, so as to generate a brightness reproduction image. In the first exemplary embodiment, this reproduction process uses the principle of Retinex theory. A reproduction process using the principle of Retinex theory will be described by using a reproduction expression indicated as Expression 1 below. In this description, a hat symbol is indicated directly above a character in each expression, but is added behind the character in text.

$$\hat{I}(x,y) = \alpha I_R(x,y) + (1-\alpha) I(x,y) \qquad \text{Expression 1}$$

With reference to the reproduction expression of Expression 1 as an example, I(x, y) denotes a pixel value of an original image, and α denotes a reproduction parameter for emphasis. Furthermore, $I_R(x, y)$ denotes a pixel value of an estimated reflectance component, and I^(x, y) denotes a pixel value of an image after the reproduction process. Thus, I^(x, y) denotes a pixel value of the original image when α=0, and denotes a pixel value of a reflectance image when α=1. Although there are several Retinex reproduction expressions proposed, the reproduction expression used is not limited to Expression 1 and may be of any type so long as the expression varies the weight of the reflectance component. Moreover, (x, y) denotes the position of an image.

Assuming that a pixel value with respect to the position (x, y) of a brightness image is defined as I(x, y), I(x, y) is separated into an illumination component L(x, y) and a reflectance component R(x, y) in the Retinex model, as indicated below.

$$I(x,y) = R(x,y) L(x,y) \qquad \text{Expression 2}$$

As it is clear from Expression 2, separating one value into two values is normally called an ill-posed problem. In an ill-posed problem, the illumination component or the reflectance component is not determinable unless the other component is estimated using some type of method.

The visibility reproducer 14 estimates L(x, y) based on I(x, y). As one characteristic of visual perception, a perceptual amount of a single spot (i.e., a single pixel in an image) of light incident on the retina is known to have an effect on the average ambient brightness of the single spot. An ambient brightness corresponds to an estimated illumination component, and an illumination estimation model is a convolution of the following function.

$$G(x, y) = k\exp\left(-\frac{x^2 + y^2}{\sigma^2}\right) \quad \text{Expression 3}$$

In this case, k denotes a coefficient to be used for normalization such that 1 is obtained when integration is implemented for pixels having a filter size for image processing, and σ denotes a smoothing scale. A convolution image with intense blurriness is obtained as σ increases. Expression 3 indicated above is an example, and may be of any type so long as the expression serves as a filter that obtains a similar (smoothing) result. For example, a bilateral filter known as a smoothing filter that performs edge preservation may be used by modifying Expression 2.

According to the principle of Retinex theory, it is known that the visual characteristics of humans estimate illumination light from around an area of interest. Although a smoothed image expresses the estimated illumination light, a suitable scale varies depending on the scene. Therefore, for example, illumination light is desirably estimated by performing a weighted averaging process from scale 1 to scale N of a multilayer image, as in Expression 4 indicated below.

$$L(x, y) = \sum_{n=1}^{N} W_n G_n(x, y) \otimes I(x, y) \quad \text{Expression 4}$$

In this case, L(x, y) denotes a pixel in an estimated illumination light image, $G_n$(x, y) denotes Expression 1 at scale n, I(x, y) denotes a pixel in an image, $W_n$ denotes a weight of scale n, and a symbol having "x" surrounded by a circle denotes a convolution. Specifically, $W_n$ may simply be 1/N, or may be variable in accordance with the layer. Furthermore, L(x, y) calculated in this manner is defined as an illumination component image.

According to Expression 2, a reflectance R(x, y) may be calculated, as in Expression 5 indicated below, based on the estimated illumination component.

$$R(x, y) = \frac{I(x, y)}{L(x, y)} \quad \text{Expression 5}$$

Specifically, a reflectance R(x, y) is calculated by using a pixel value I(x, y) of a brightness image and a pixel value L(x, y) of an illumination component image. An image having this reflectance R(x, y) as a pixel value is a reflectance image.

Furthermore, as indicated in Expression 1, a visibility reproduction brightness image is generated in accordance with the reflectance R(x, y) and the brightness image I(x, y) in Expression 5, and the reproduction parameter σ.

Visibility is greatly affected by the reproduction parameter σ. Therefore, in the first exemplary embodiment, a reproduction parameter analyzer 12 is used to estimate a reproduction parameter in an input-device space from a feature value of an image, and an output-device optimal-reproduction-parameter calculator 13 is used to set an optimal reproduction parameter in view of the color gamut of an output device.

Reproduction Parameter Analyzer 12

Figure 5:
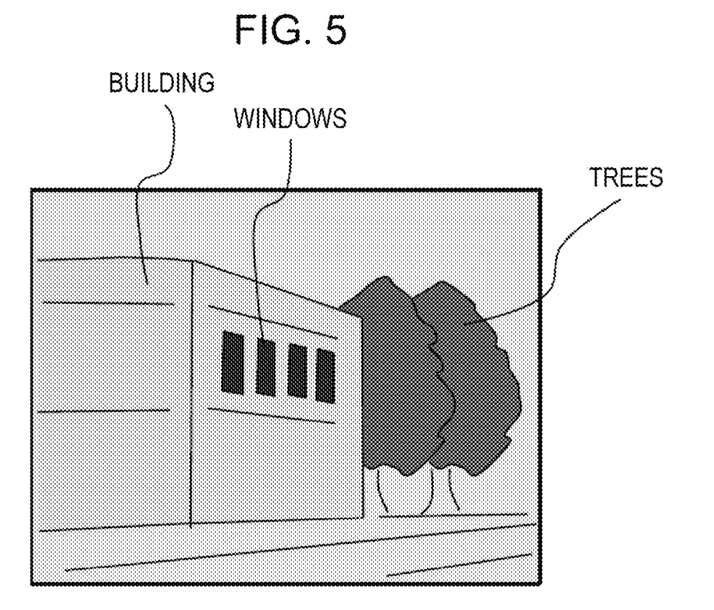
FIG. 5 illustrates an example of a scenery image for explaining dark areas according to the first exemplary embodiment of the disclosure.
Figure 6:
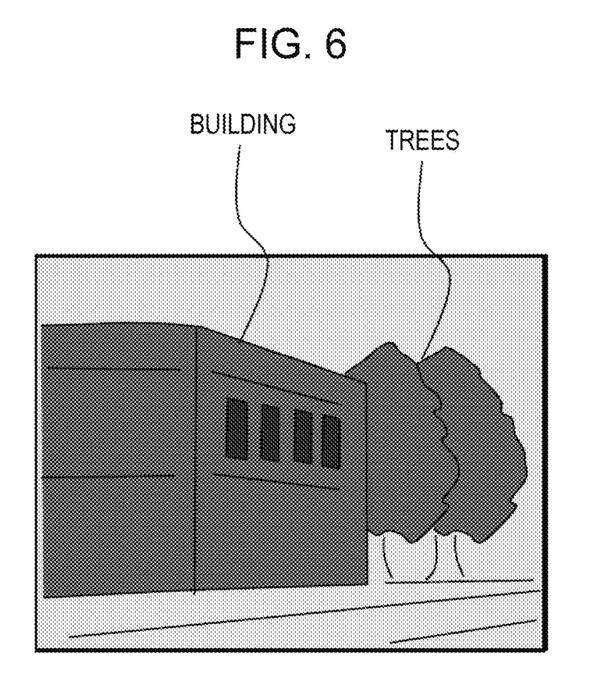
FIG. 6 illustrates another example of a scenery image for explaining dark areas according to the first exemplary embodiment of the disclosure.

The reproduction parameter analyzer 12 estimates a reproduction parameter from a feature value of an image in the input-device space. An example will be described here by using scenery images in FIGS. 5 and 6. In FIG. 5, the trees and the windows in the building are dark areas with poor visibility. In FIG. 6, the trees and the building are dark areas with poor visibility. Although the brightness of the trees is the same between FIGS. 5 and 6, the brightness of the building is lower in FIG. 6, resulting in the overall image in FIG. 6 having poorer visibility. It is thus determined that the image in FIG. 6 is to be increased in intensity with respect to the reproduction parameter.

As mentioned in the above example, if dark areas have the same brightness, the larger dark area has poorer visibility. Thus, two feature values of an image, namely, the percentage of the number of pixels in the dark area (i.e., the size of the dark area) relative to the number of pixels in the entire image and the average brightness of the dark area, are used. This will be described by using a brightness component. A brightness image converted from an input-device RGB image will be defined as L*(x, y). Then, an image obtained as a result of binarizing L*(x, y) at a maximum of 1 and a minimum of 0 based on a certain threshold value is defined as L*'(x, y).

A percentage r, serving as a feature value, of the number of pixels in the dark area may be expressed as in Expression 6 below, assuming that the overall number of pixels in the image is defined as N' and the number of pixels in the dark area is defined as N.

$$r = \frac{N}{N'} \quad \text{Expression 6}$$

Furthermore, an average brightness L*ave of the dark area may be expressed as in Expression 7 below by using L* (x, y) and L*' (x, y).

$$L*_{ave} = \frac{\sum (L*(x, y) \times L'*(x, y))}{N} \quad \text{Expression 7}$$

Although the reproduction parameter σ is calculated by using the feature values calculated in Expression 6 and Expression 7, the following description relates to an example where the reproduction parameter σ is calculated based on the average brightness of the dark area.

First, in a case where the reproduction parameter is to be estimated by using the average brightness of the dark area alone, the reproduction parameter may be expressed as in Expression 8 indicated below.

$$\alpha = a \times L*_{ave} \quad \text{Expression 8}$$

In this case, a denotes a coefficient set such that a reproduction parameter set based on, for example, a sensory evaluation test executed in advance has a minimal error in accordance with the least squares method.

Output-Device Optimal-Reproduction-Parameter Calculator 13

The output-device optimal-reproduction-parameter calculator 13 sets an output-device optimal reproduction parameter by using a compression rate, saved in advance as data, of the color gamuts of the input device (i.e., the liquid crystal display) and the output device (i.e., the image forming unit 208).

Figure 8:
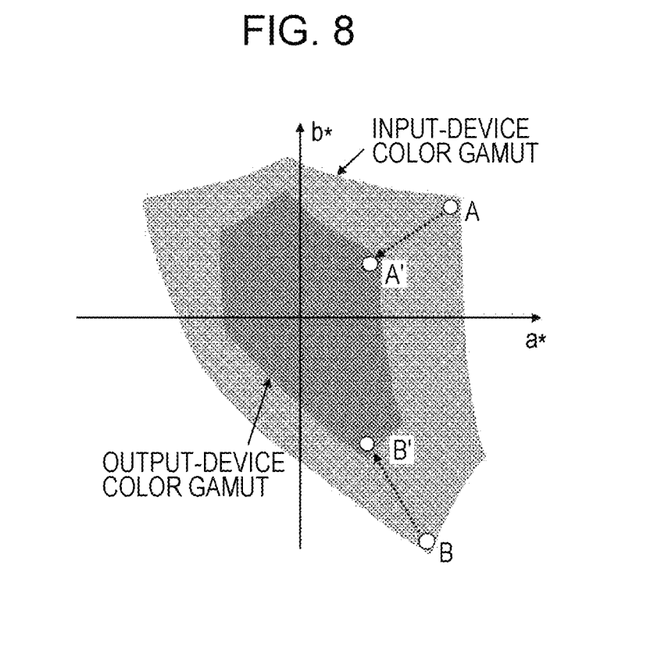
FIG. 8 illustrates an example of color gamuts of an input device and an output device on an a*b* plane.
Figure 9:
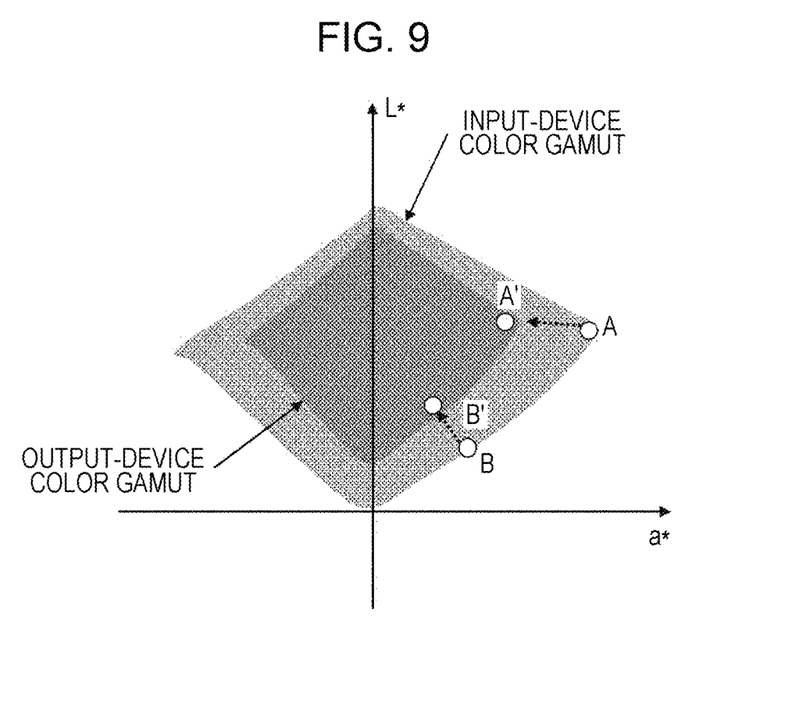
FIG. 9 illustrates an example of the color gamuts of the input device and the output device on an L*a* plane.

Normally, when the input device and the output device have different color gamuts, a color not reproducible in the output device has to be converted into a reproducible color. An example will be described with reference to FIGS. 8 and 9. FIG. 8 illustrates the color gamuts of the input device and the output device by cutting out an a*b* plane. FIG. 9 illustrates the color gamuts of the input device and the output device by cutting out an L*a* plane. Because the input device has a larger color gamut than that of the output device, the colors in the input device have to be converted into colors reproducible in the output device, as in point A to point A' and point B to point B'. Examples of the conversion method include minimizing "color difference" serving as a unit of measurement obtained by converting a color difference into a numeral, and a method of minimizing the color difference while maintaining hue.

The color gamut of each of these devices is normally a group of multiple colors. If the device is a liquid crystal display (i.e., the display unit 106), the colors displayed on the liquid crystal display are directly measured. If the device is a printer (i.e., the image forming unit 208), a patch sample output to, for example, paper is measured. The color gamut of each device may be defined in this manner. With regard to the colors to be measured, data set based on an international standard, such as ISO, is often used.

The ratio between the sizes of the color gamuts of the two devices, that is, the ratio between the volumes of the two devices in the L*a*b* space, is expressed as a compression rate. For example, the volume of the color gamut (second color gamut) of the output device is compared with the volume of the color gamut (first color gamut) of the input device in FIGS. 8 and 9. If the volume ratio is 0.5, the compression rate is set to 50%. Then, this compression rate is used to set an optimal reproduction parameter.

Figure 10:
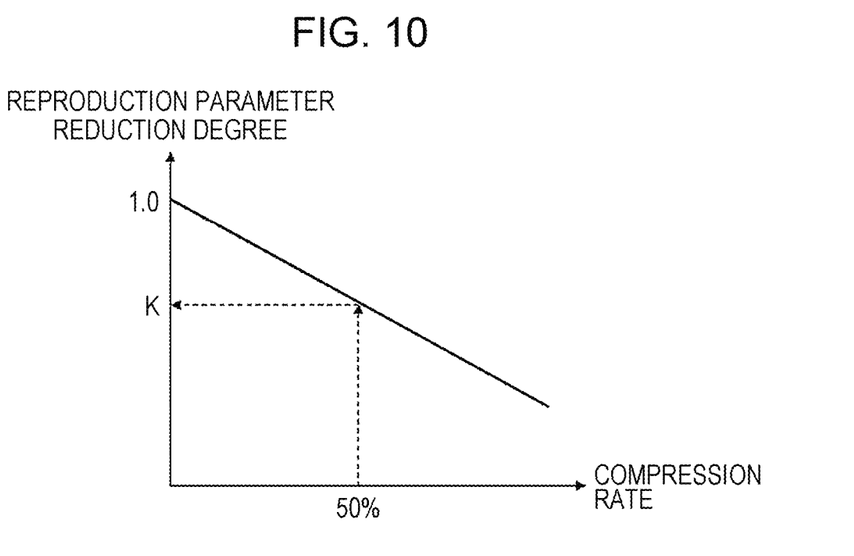
FIG. 10 illustrates an example of a function in which a compression rate and a reproduction-parameter reduction degree are associated with each other.

In detail, because the input device has the larger color gamut, a colored area is reproduced vividly, whereas a dark area is reproduced darkly. Therefore, when a reproduction parameter is calculated using the color gamut of the input device, the reproduction parameter is larger than a reproduction parameter calculated using the smaller color gamut of the output device, and is too intense in the output-device space. Thus, based on a relationship shown in FIG. 10, a coefficient K serving as a reproduction-parameter reduction degree by which the reproduction parameter when the compression rate is 50% is changed from a reference value (1.0) in a case where the color gamut of the input device and the color gamut of the output device are equal to each other is calculated. An output-device optimal reproduction parameter α' may be expressed as in Expression 9 by using the coefficient K and the reproduction parameter α calculated by the reproduction parameter analyzer 12.

$$\alpha' = K \times \alpha \qquad \text{Expression 9}$$

Finally, the visibility reproducer 14 calculates a in Expression 1 as α' in Expression 9, thereby generating a visibility reproduction brightness image in view of the color gamut of the output device.

Although the relationship between the compression rate and the reproduction-parameter reduction degree is indicated as a linear relationship, any function shape may be used, including a nonlinear curve, so long as the value of the reproduction-parameter reduction degree decreases or is invariable with increasing compression rate. Furthermore, although a volume is used for calculating a compression rate, for example, the volume of only a dark area having L* of 20 or smaller may be used, or the compression rate may be calculated at a single axis of L*.

Inverse Color-Space Converter 15

An inverse color-space converter 15 inversely converts a CIE L*a*b* color space into an RGB color space. Accordingly, a visibility reproduction brightness image is generated, so that an image to be printed by the image forming unit 208 as an example of an output device may be generated.

Next, the operation of the image processing apparatus 100 will be described.

Figure 11:
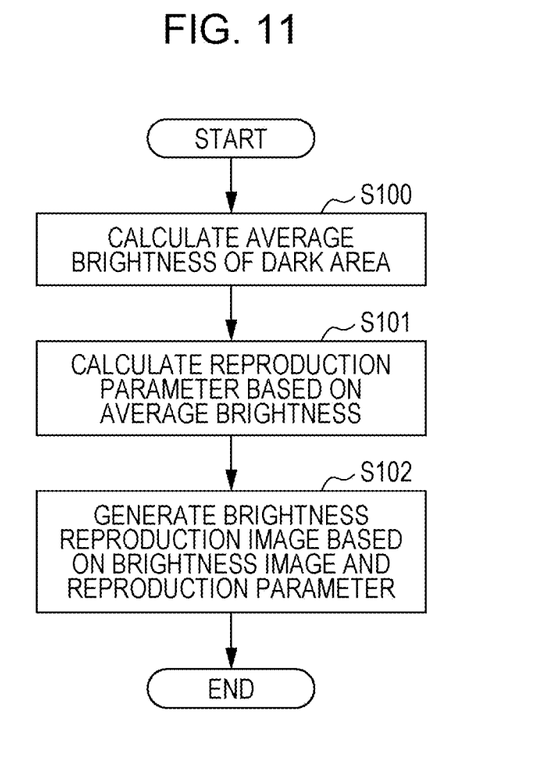
FIG. 11 is a flowchart illustrating an example of operation performed by the image processing apparatus according to the first exemplary embodiment of the disclosure.

FIG. 11 is a flowchart illustrating an example of the operation of the image processing apparatus 100 when generating a brightness reproduction image.

As shown in FIG. 11, in step S100, the CPU 101 of the image processing apparatus 100 calculates an average brightness of a dark area when an output process to an output device is to be performed. Then, the process proceeds to step S101.

In step S101, the CPU 101 of the image processing apparatus 100 calculates a reproduction parameter based on the average brightness calculated in step S100. Subsequently, the process proceeds to step S102.

In step S102, the CPU 101 of the image processing apparatus 100 generates a brightness reproduction image in accordance with Expression 1 based on a brightness image to be output to the output device and the reproduction parameter calculated in step S101. Then, the process ends.

Second Exemplary Embodiment

Next, a second exemplary embodiment will be described. The first exemplary embodiment described above relates to an example where a reproduction parameter is estimated by using the average brightness of a dark area alone (see Expression 8). In the second exemplary embodiment, a reproduction parameter is estimated in view of the percentage of the size (i.e., the number of pixels) of a dark area.

The following description focuses on differences from the first exemplary embodiment described above, and redundant explanations will be simplified or omitted.

In order to take into account the percentage of the number of pixels in a dark area, the coefficient a in Expression 8 described in the first exemplary embodiment is replaced with a coefficient a(r) serving as a function of the percentage of the number of pixels in the dark area, as indicated in Expression 10.

$$\alpha = a(r) \times L^*_{ave} \qquad \text{Expression 10}$$

For example, assuming that the coefficient a(r) in Expression 10 is a linear function, the coefficient a(r) may be expressed as in Expression 11.

$$a(r) = a_0 + a_1 \times r \qquad \text{Expression 11}$$

Then, according to Expression 10, the reproduction parameter may be expressed as in Expression 12.

$$\alpha = (a_0 + a_1 \times r) \times L^*_{ave} \qquad \text{Expression 12}$$

Figure 7:
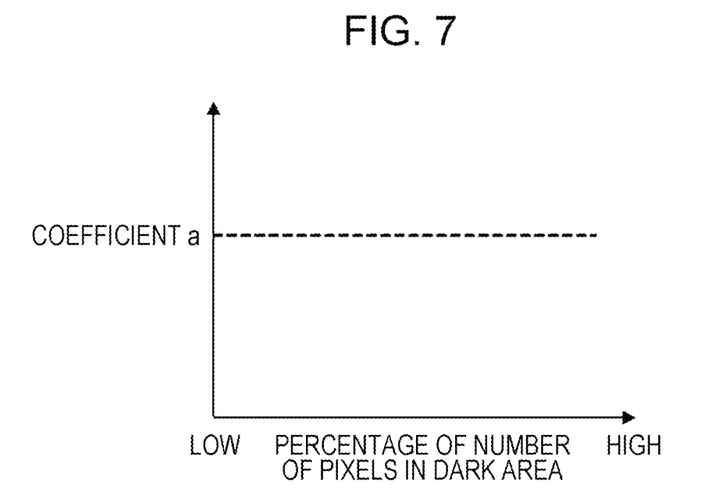
FIG. 7 illustrates an example of a coefficient associated with a percentage of the number of pixels in a dark area according to the first exemplary embodiment of the disclosure.
Figure 12:
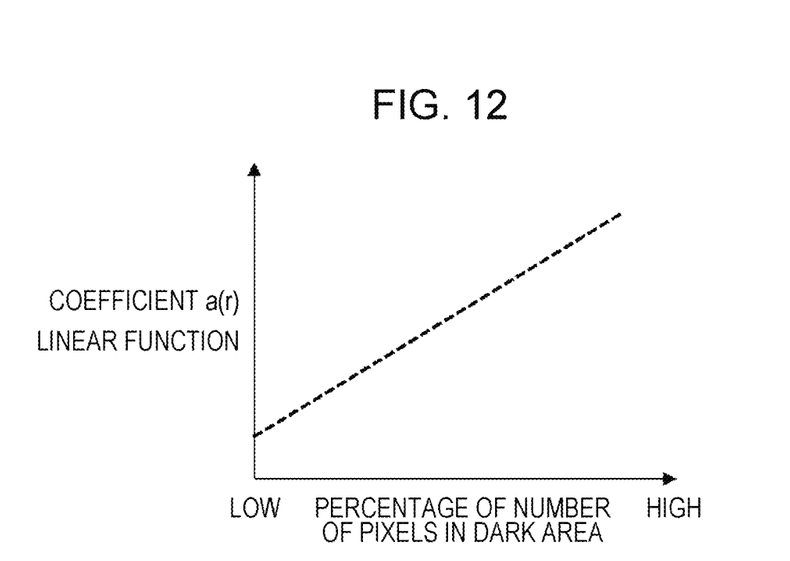
FIG. 12 illustrates an example of a coefficient associated with a percentage of the number of pixels in a dark area when the coefficient according to a second exemplary embodiment of the disclosure is a linear function.

As indicated in Expression 12, the coefficient a in Expression 8 serves as the function of the percentage of the number of pixels in the dark area, so that the reproduction parameter may be estimated in view of the percentage of the number of pixels in the dark area. When this is explained by using a drawing, the coefficient is fixed regardless of the percentage of the size (i.e., the number of pixels) of the dark area in the case of Expression 8, as shown in FIG. 7. In contrast, in the case of Expression 11, the coefficient varies in accordance with the percentage of the number of pixels in the dark area, as shown in FIG. 12. Accordingly, the coefficient increases with increasing percentage of the number of pixels in the dark area, so that the reproduction parameter may be increased even when the average brightness of the dark area is the same. Similar to the above, $a_0$ and $a_1$ may each be a coefficient set such that a reproduction parameter set based on, for example, a sensory evaluation test executed in advance has a minimal error in accordance with the least squares method.

Figure 13:
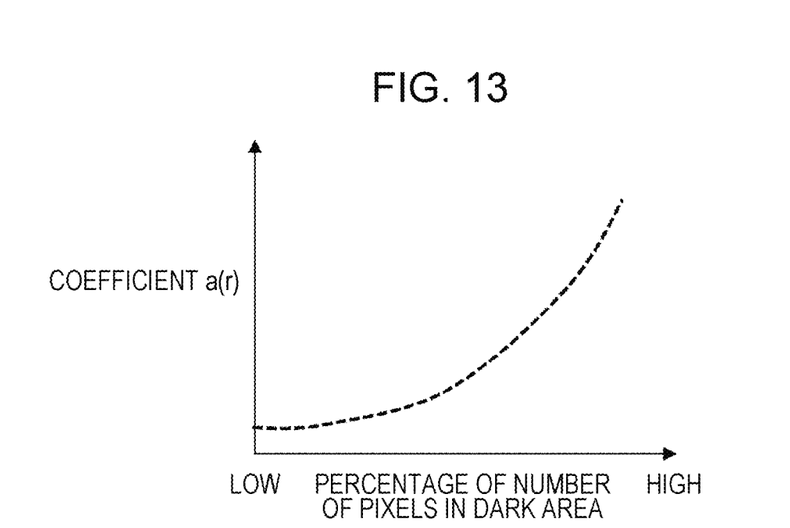
FIG. 13 illustrates an example of a coefficient associated with a percentage of the number of pixels in the dark area when the coefficient according to the second exemplary embodiment of the disclosure is a multidimensional function.

Although assumed as being a linear function as an example, the coefficient a(r) may be a multidimensional function such that the relationship that the coefficient has with the percentage of the number of pixels in the dark area becomes nonlinear, as shown in FIG. 13, whereby the reproduction parameter may be estimated with higher accuracy.

In detail, assuming that the coefficient a(r) is a multidimensional function, the coefficient a(r) may be expressed as in Expression 13.

$$a(r) = \sum_{i=0}^{n} (a_i \times r^i) \quad \text{Expression 13}$$

In the above examples, a reproduction parameter is calculated by calculating a feature value based on a threshold value at a certain lightness hierarchical level. Alternatively, as indicated in Expression 14, a reproduction parameter may be set by calculating feature values at multiple lightness hierarchical levels.

$$\alpha = \sum_{i=0}^{n} (a_i(r_i) \times L^*_{i_{ave}}) \quad \text{Expression 14}$$

For example, when n=1, the reproduction parameter may be expressed as in Expression 15 by expanding Expression 14.

$$\alpha = a_0(r_0) \times L^*_{0_{ave}} + a_1(r_1) \times L^*_{1_{ave}} \quad \text{Expression 15}$$

Figure 14:
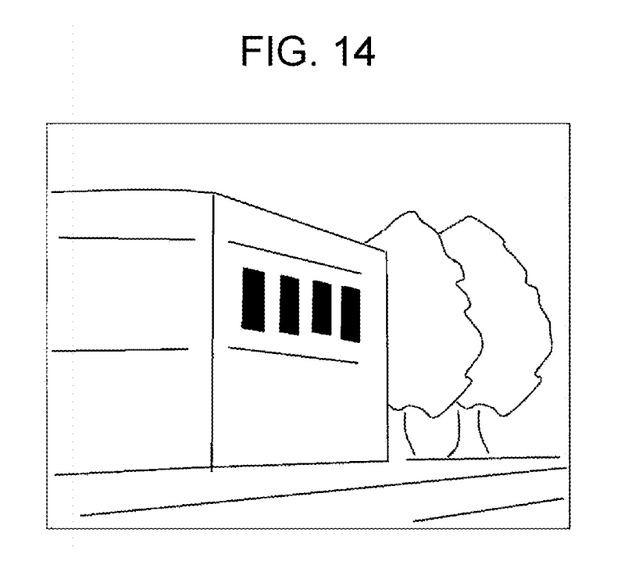
FIG. 14 illustrates an example where the lightness at which windows alone are extracted as low brightness areas from a scenery image used for explaining dark areas is defined as a lightness hierarchical level, and an image is binarized at this lightness hierarchical level.
Figure 15:
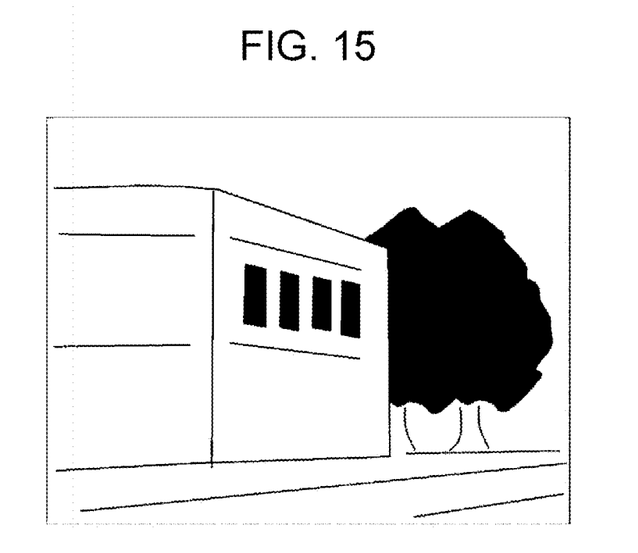
FIG. 15 illustrates an example where the lightness at which windows and trees are extracted as low-to-intermediate brightness areas from the scenery image used for explaining dark areas is defined as a lightness hierarchical level, and an image is binarized at this lightness hierarchical level.

A method for setting multiple lightness hierarchical levels will be described with reference to FIG. 5 as an example. For example, the lightness at which the windows alone are extracted as low brightness areas in FIG. 5 is defined as a first lightness hierarchical level. An image binarized at this lightness hierarchical level is shown in FIG. 14. A feature value calculated at this lightness hierarchical level is expressed in the first term of the right hand side of Expression 15. Then, the lightness at which the windows and the trees are extracted as low-to-intermediate brightness areas in FIG. 5 is defined as a second lightness hierarchical level. An image binarized at this lightness hierarchical level is shown in FIG. 15. A feature value calculated at this lightness hierarchical level is expressed in the second term of the right hand side of Expression 15. Specifically, a reproduction parameter is set by using the average brightness for each lightness hierarchical level obtained by separating the dark areas into multiple lightness hierarchical levels.

By using multiple lightness hierarchical levels in this manner, the feature values at the multiple lightness hierarchical levels may be taken into account, so that the weight on each parameter may be varied depending on the lightness hierarchical level, whereby a reproduction parameter with higher versatility may be estimated. The coefficients related to $a_0$ and $a_1$ may each be set such that a reproduction parameter set based on, for example, a sensory evaluation test executed in advance has a minimal error in accordance with the least squares method, or may each be set such that the weight increases with increasing lightness hierarchical level of the dark area.

Third Exemplary Embodiment

Next, a third exemplary embodiment will be described.

In the first exemplary embodiment and the second exemplary embodiment described above, the compression rate of the color gamut of the output device relative to that of the input device is saved in advance as information, and the calculation is performed uniformly by using the compression rate. Thus, the compression rate varies depending on the device, but does not vary depending on the image. In the third exemplary embodiment, the compression rate is calculated based on pixel information of an input image, so that the compression rate varies depending on the image. Accordingly, an output-device optimal reproduction parameter may be set more appropriately in accordance with the image.

The following description focuses on differences from the first exemplary embodiment and the second exemplary embodiment described above, and redundant explanations will be simplified or omitted.

Figure 16:
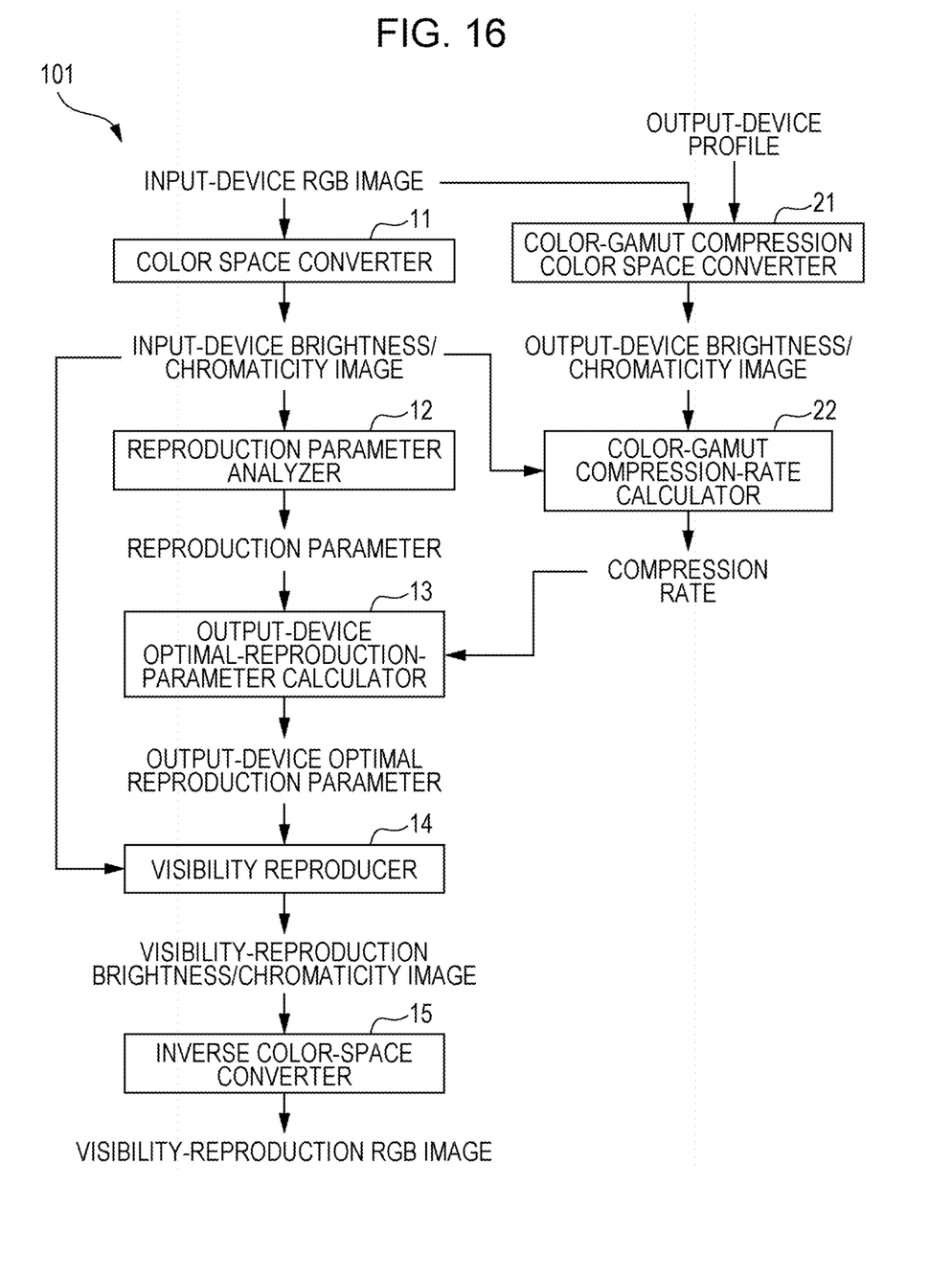
FIG. 16 is a block diagram illustrating an example of a functional configuration of an image processing apparatus according to a third exemplary embodiment of the disclosure.

FIG. 16 illustrates a block diagram expressing the third exemplary embodiment of the disclosure. The color space converter 11, the reproduction parameter analyzer 12, the output-device optimal-reproduction-parameter calculator 13, the visibility reproducer 14, and the inverse color-space converter 15 are identical to those in the first exemplary embodiment.

A color-gamut compression color space converter 21 converts an input-device RGB image into a lightness/chromaticity color space, such as a CIE L*a*b* color space, compressed to the color gamut of the output device based on a preliminarily-saved profile of the output device. The components of CIE L*, a*, b* respectively indicate lightness, chromaticity in the red-green direction, and chromaticity in the blue-yellow direction. In the third exemplary embodiment, a* and b* will be defined as chromaticity components, and L* will be defined as a brightness component. The color space may be of any type so long as the color space is separable into lightness and chromaticity components, such as Lαβ, CAM02, and HSV.

A color-gamut compression-rate calculator 22 compares the chromaticity and brightness components in the input-device RGB image converted by the color space converter 11 with the chromaticity and brightness components compressed to the output-device color gamut converted by the color-gamut compression color space converter 21 for each pixel, so as to calculate a compression rate. Although the calculation method is basically the same as that in the first and second exemplary embodiments, the data to be used for the calculation is input image information. Specifically, the compression rate of each pixel in the RGB image is calculated based on a*, b*, and L* of all the pixels acquired by the color-gamut compression color space converter 21 and a*, b*, and L* of all the pixels converted by the color space converter 11.

As an alternative to each of the above exemplary embodiments in which the image processing program is preliminarily stored (installed) in the ROM 102 or the storage unit 104, the program may be provided by being stored in a storage medium, such as a compact disk read-only memory (CD-ROM), a digital versatile read-only memory (DVD-ROM), or a universal serial bus (USB) memory. As another alternative, the program may be downloaded from an external apparatus via a network.

The disclosure is not limited to the first to third exemplary embodiments described above, and permits various modifications and applications so long as they do not depart from the scope of the disclosure.

In the exemplary embodiments above, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In the exemplary embodiments above, the term "processor" is broad enough to encompass one processor or plural processors in collaboration which are located physically apart from each other but may work cooperatively. The order of operations of the processor is not limited to one described in the exemplary embodiments above, and may be changed.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
   a processor configured to:
      adjust a reproduction parameter for correcting image visibility by changing a degree by which the reproduction parameter is to be changed from a reference value in accordance with a ratio of a second color gamut to a first color gamut, the first color gamut indicating a range in which an image is expressible by a first device, the second color gamut indicating a range in which an image is expressible by a second device,
   wherein the reproduction parameter is derived by using an average brightness of a dark area in which a pixel value satisfies a predetermined criterion.

2. The image processing apparatus according to claim 1, wherein the reproduction parameter is derived by using an average brightness of each lightness hierarchical level obtained by separating the dark area into a plurality of lightness hierarchical levels.

3. The image processing apparatus according to claim 2, wherein the reproduction parameter is derived from the average brightness and a size of the dark area.

4. The image processing apparatus according to claim 3, wherein the reproduction parameter increases with increasing size of the dark area.

5. The image processing apparatus according to claim 4, wherein the degree by which the reproduction parameter is to be changed from the reference value increases with increasing compression rate serving as the ratio of the second color gamut to the first color gamut.

6. The image processing apparatus according to claim 3, wherein the degree by which the reproduction parameter is to be changed from the reference value increases with increasing compression rate serving as the ratio of the second color gamut to the first color gamut.

7. The image processing apparatus according to claim 3, wherein the processor is configured to adjust the reproduction parameter by changing the degree by which the reproduction parameter is to be changed from the reference value in accordance with the ratio of the second color gamut to the first color gamut, the first color gamut indicating a range in which a pixel of an image is expressible by the first device, the second color gamut indicating a range in which a pixel of an image is expressible by the second device.

8. The image processing apparatus according to claim 2, wherein the degree by which the reproduction parameter is to be changed from the reference value increases with increasing compression rate serving as the ratio of the second color gamut to the first color gamut.

9. The image processing apparatus according to claim 2, wherein the processor is configured to adjust the reproduction parameter by changing the degree by which the reproduction parameter is to be changed from the reference value in accordance with the ratio of the second color gamut to the first color gamut, the first color gamut indicating a range in which a pixel of an image is expressible by the first device, the second color gamut indicating a range in which a pixel of an image is expressible by the second device.

10. The image processing apparatus according to claim 1, wherein the reproduction parameter is derived from the average brightness and a size of the dark area.

11. The image processing apparatus according to claim 10, wherein the reproduction parameter increases with increasing size of the dark area.

12. The image processing apparatus according to claim 11, wherein the degree by which the reproduction parameter is to be changed from the reference value increases with increasing compression rate serving as the ratio of the second color gamut to the first color gamut.

13. The image processing apparatus according to claim 10, wherein the degree by which the reproduction parameter is to be changed from the reference value increases with increasing compression rate serving as the ratio of the second color gamut to the first color gamut.

14. The image processing apparatus according to claim 10, wherein the processor is configured to adjust the reproduction parameter by changing the degree by which the reproduction parameter is to be changed from the reference value in accordance with the ratio of the second color gamut to the first color gamut, the first color gamut indicating a range in which a pixel of an image is expressible by the first device, the second color gamut indicating a range in which a pixel of an image is expressible by the second device.

15. The image processing apparatus according to claim 1, wherein the degree by which the reproduction parameter is to be changed from the reference value increases with increasing compression rate serving as the ratio of the second color gamut to the first color gamut.

16. The image processing apparatus according to claim 1, wherein the degree by which the reproduction parameter is to be changed from the reference value increases with increasing compression rate serving as the ratio of the second color gamut to the first color gamut.

17. The image processing apparatus according to claim 1, wherein the processor is configured to adjust the reproduction parameter by changing the degree by which the reproduction parameter is to be changed from the reference value in accordance with the ratio of the second color gamut to the first color gamut, the first color gamut indicating a range in which a pixel of an image is expressible by the first device, the second color gamut indicating a range in which a pixel of an image is expressible by the second device.

18. The image processing apparatus according to claim 1, wherein the processor is configured to adjust the reproduction parameter by changing the degree by which the reproduction parameter is to be changed from the reference value in accordance with the ratio of the second color gamut to the first color gamut, the first color gamut indicating a range in which a pixel of an image is expressible by the first device, the second color gamut indicating a range in which a pixel of an image is expressible by the second device.

19. A non-transitory computer readable medium storing a program causing a computer to execute a process, the process comprising:

adjusting a reproduction parameter for correcting image visibility by changing a degree by which the reproduction parameter is to be changed from a reference value in accordance with a ratio of a second color gamut to a first color gamut, the first color gamut indicating a range in which an image is expressible by a first device, the second color gamut indicating a range in which an image is expressible by a second device; wherein the reproduction parameter is derived by using an average brightness of a dark area in which a pixel value satisfies a predetermined criterion.

\* \* \* \* \*